United States Patent
Brie et al.

(10) Patent No.: US 6,654,688 B1
(45) Date of Patent: Nov. 25, 2003

(54) PROCESSING SONIC WAVEFORM MEASUREMENTS

(75) Inventors: Alain Brie, Versailles (FR); Takeshi Endo, Sagamihara (JP); Henri-Pierre Valero, Machida (JP); Vivian Pistre, Tokyo (JP); Yoshiyuki Saiki, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/937,935

(22) PCT Filed: Mar. 27, 2000

(86) PCT No.: PCT/IB00/00353
§ 371 (c)(1),
(2), (4) Date: Jan. 18, 2002

(87) PCT Pub. No.: WO00/60380
PCT Pub. Date: Oct. 12, 2000

(30) Foreign Application Priority Data

Apr. 1, 1999 (GB) .............................................. 9907620

(51) Int. Cl.[7] .................................................. G01V 3/00
(52) U.S. Cl. ............................................ 702/2; 703/10
(58) Field of Search ........................ 702/2, 14; 367/25, 367/76, 32, 28, 40, 31; 382/36

(56) References Cited

U.S. PATENT DOCUMENTS

| 4,422,165 | A | | 12/1983 | Thomas et al. ............... 367/40 |
|---|---|---|---|---|
| 4,809,236 | A | | 2/1989 | Hsu et al. ..................... 367/28 |
| 5,278,805 | A | * | 1/1994 | Kimball ....................... 367/32 |
| 5,361,379 | A | | 11/1994 | White .......................... 382/36 |
| 5,587,966 | A | * | 12/1996 | Kimball et al. ............... 367/31 |
| 5,594,706 | A | * | 1/1997 | Shenoy et al. ................ 367/76 |
| 5,831,934 | A | | 11/1998 | Gill et al. ..................... 367/25 |

FOREIGN PATENT DOCUMENTS

WO  WO 97/28464  8/1997  ............ G01V/1/40

OTHER PUBLICATIONS

Kai Hsu, and Shu–Kong Chang, Multiple–Shot Processing of Array Sonic Waveforms, Oct. 1987, Geophysics, vol. 52, pp. 1376 to 1390.*

Kurien, T., 1992, Issues in the design of practical multi–target tracking algorithms., Multitarget–multisensor tracking: applications and approaches., Artech House.

* cited by examiner

*Primary Examiner*—John Barlow
*Assistant Examiner*—Victor J. Taylor
(74) *Attorney, Agent, or Firm*—Robin Nava; Brigitte Jeffery; John Ryberg (57) ABSTRACT

Methods for determining the best value for at least one slowness-related parameter that has been determined in a number of ways is disclosed. Sonic logging data input in the methods are processed to determine multiple values of at least one slowness-related parameter using slowness/time coherence (STC) processing methods. The error of each determined parameter is determined and the determined errors used in selecting a representative parameter value from the multiple determined slowness-related parameter values.

20 Claims, 5 Drawing Sheets

PROCESSING SONIC WAVEFORM MEASUREMENTS

FIELD OF THE INVENTION

The present invention relates to methods for processing sonic waveform measurements, particularly sonic waveform measurements made for the purpose of characterising properties of underground formations. The invention in particular relates to methods for determining the best value for a parameter that has been determined in a number of different ways.

RELATED ART

Figure 1:
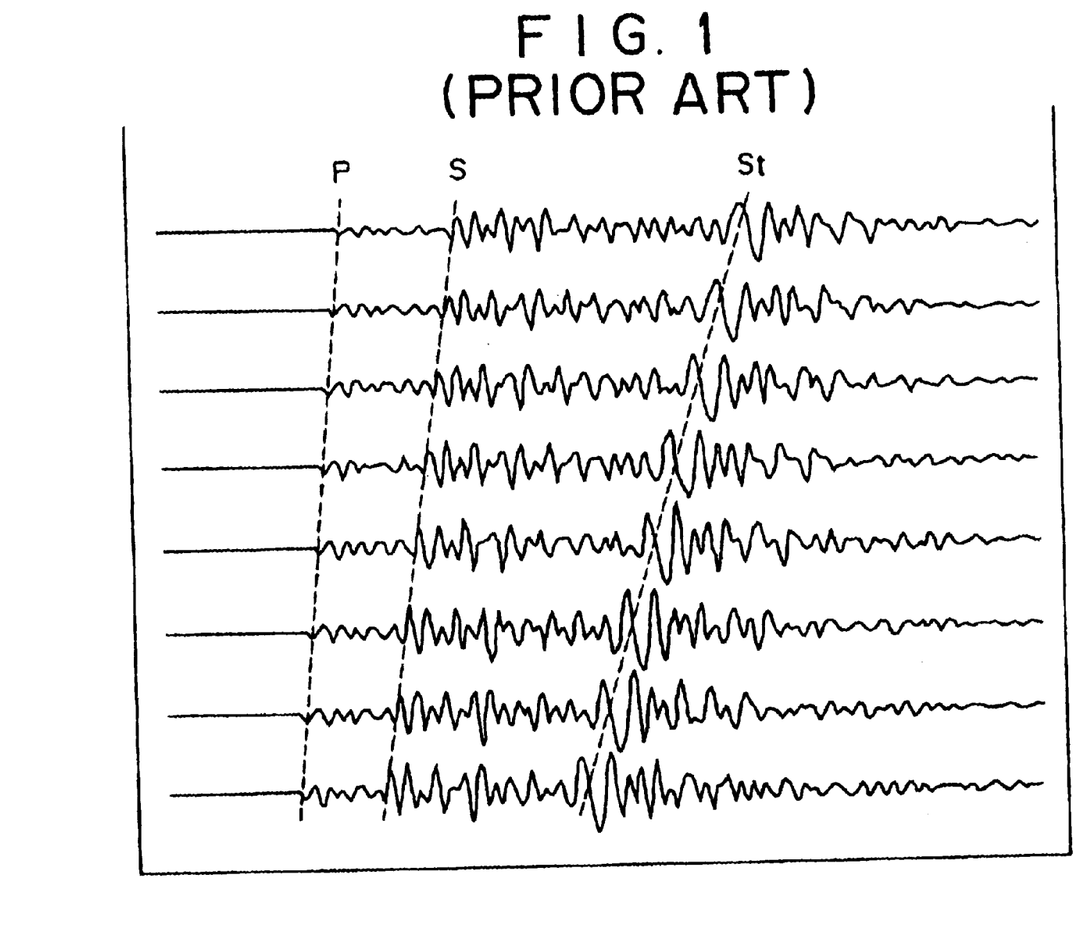
FIGS. 1 shows a plot of sonic waveforms in time indicating arrivals of various components.

It has been know for some time that it is possible to determine properties of underground formations using measurements of acoustic/sonic waves that have passed through the formations. The basic technique comprises placing a tool comprising a spaced sonic source and receiver in the borehole and using the source to generate sonic waves which pass through the formation around the borehole and are detected at the receiver. Sonic waves can travel through rock formations in essentially two forms: body waves and surface waves. There are two types of body waves that travel in rock: compressional and shear. Compressional waves, or P-waves, are waves of compression and expansion and are created when rock formation is sharply compressed. With compressional waves, small particle vibrations occur in the ,same direction the wave is travelling. Shear waves, or S-waves, are waves of shearing action as would occur when a body is struck from the side. In this case, rock particle motion is perpendicular to the direction of wave propagation. The surface waves are found in a borehole environment as complicated borehole guided waves which come from reflections of the source waves reverberating in the borehole. The most common form or borehole-guided, surface wave is the Stoneley wave. FIG. 1 shows a series of sonic waveforms such as would be recorded in a borehole from a monopole (omnidirectional) source with the first arrivals of the compressional (P), shear (S) and Stoneley (St) waves at the receiver marked. In situations where dipole (directional) sources and receivers are used, an additional shear/flexural wave propagates along the borehole and is caused by the flexing action of the borehole in response to the dipole signal from the source The flexural wave typically travels at about the same speed as the shear wave, slower than the compressional wave. (It is to be noted that sonic waves will also travel through the fluid in the borehole and along the tool itself. With no interaction with the formation, these waves carry no useful information and run on wireline or coiled tubing or the like, or alternatively can be a logging while drilling tool located in a drill string being used to drill the borehole.

The speeds at which these waves travel through the rock are controlled by rock mechanical properties such as density and elastic dynamic constants, and other formation properties such as amount and type of fluid present in the rock, the makeup of the rock grains and the degree of intergrain cementation. Thus by measuring the speed of sonic wave propagation in a borehole, it is possible to characterise the surrounding formations by parameters relating these properties. The speed or velocity of a sonic wave is often expressed in terms of 1/velocity and is called "slowness". Since the tools used to make sonic measurements in boreholes are of fixed length, the difference in time ($\Delta T$) taken for a sonic wave to travel between two points on the tool is directly related to the speed/slowness of the wave in the formation.

Figure 2:
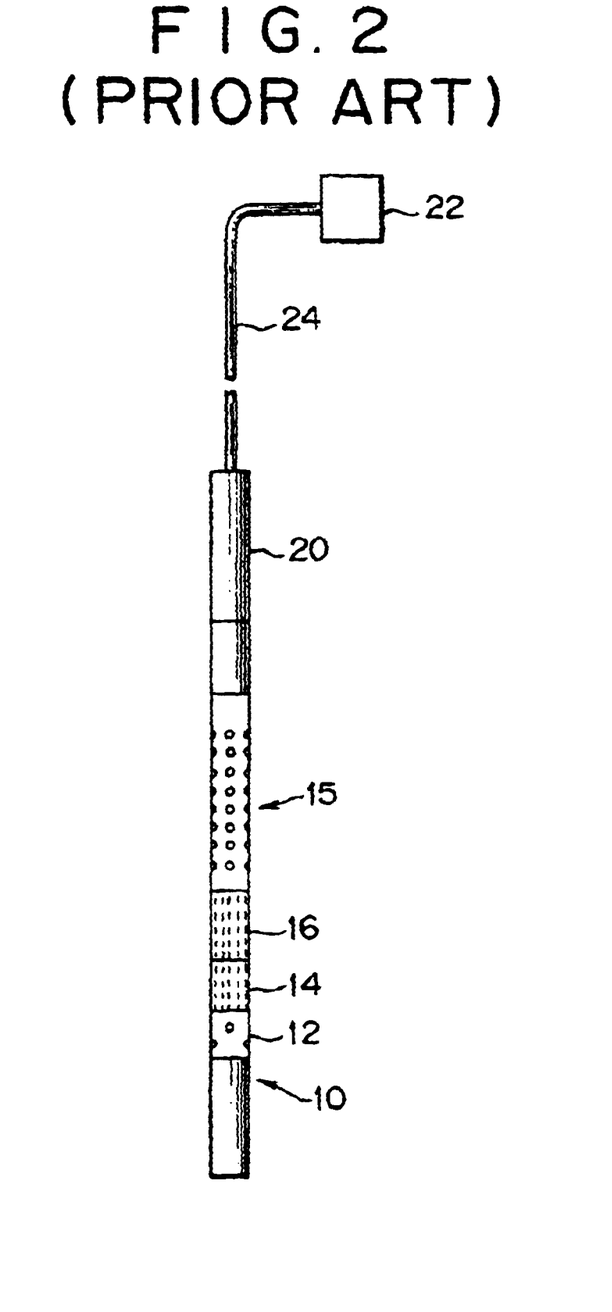
FIG. 2 shows a prior art sonic logging tool.

An example of a tool for use in a borehole for sonic measurements is the DSI tool of Schlumberger which is shown schematically in FIG. 2. The DSI tool comprises a transmitter section 10 having a pair of (upper and lower) dipole sources 12 arranged orthogonally in the radial plane and a monopole source 14. A sonic isolation joint 16 connects the transmitter section 10 to a receiver section 18 which contains an array of eight spaced receiver stations, each containing two hydrophone pairs, one oriented in line with one of the dipole sources, the other with the orthogonal source. An electronics cartridge 20 is connected at the top of the receiver section 18 and allows communication between the tool and a control unit 22 located at the surface via an electric cable 24. With such a tool it is possible to make both monopole and dipole measurements. The DSI tool has several data acquisition operating modes, any of which may be combined to acquire (digitised) waveforms. The modes are: upper and lower dipole modes (UDP, LDP)— waveforms recorded from receiver pairs aligned with the respective dipole source used to generate the signal; crossed dipole mode—waveforms recorded from each receiver pair for firings of the in-line and crossed dipole source; Stoneley mode—monopole waveforms from low frequency firing of the monopole source; P and S mode (P&S)—monopole waveforms from high frequency firing of the monpole transmitter; and first motion mode—monopole threshold crossing data from high frequency firing of the monopole source.

One way to determine compressional, shear and Stoneley slownesses from these measurements is to use slowness-time-coherence (STC) processing. STC processing is a full waveform analysis technique which aims to find all propagating waves in the composite waveform. The processing adopts a semblance algorithm to detect arrivals that are coherent across the array of receivers and estimates their slowness. The basic algorithm advances a fixed-length time window across the waveforms in small, overlapping steps through a range of potential arrival times. For each time position, the window position is moved out linearly in time, across the array of receiver waveforms, beginning with a moveout corresponding to the fastest wave expected and stepping to the slowest wave expected. For each moveout, a coherence function is computed to measure the similarity of the waves within the window. When the window time and the moveout correspond to the arrival time and slowness of a particular component, the waveforms within the window are almost identical, yielding a high value of coherence. In this way, the set of waveforms from the array is examined over a range of possible arrival times and slownesses for wave components. STC processing produces coherence (semblance) contour plots in the slowness/arrival time plane. Regions of large coherence correspond to particular arrivals in the waveforms. The slowness and arrival time at each coherence peak are compared with the propagation characteristics expected of the arrivals being sought and the ones that best agree with these characteristics are retained. Classifying the arrivals in this manner produces a continuous log of slowness versus depth. For dispersive waves, the STC processing is modified to take into account the effect of frequency. As the output of STC processing is a coherence plot, the coherence of each arrival can be used as a quality indicator, higher values implying greater measurement repeatability. When processing dipole waveforms, one of the coherence peak will correspond to the flexural mode but with a slowness that is always greater (slower) than the true shear slowness. A precomputed correction is used to remove this bias.

To compensate for variations in measurements due to the borehole rather than due to the formation a series of measurements are made across an interval in which the formation properties are expected to vary little, if at all. In its simplest form, the interval corresponds to the extent of the receiver array, and the waveforms at each receiver station measured for a given firing of a source ("receiver array" or "receiver mode" or "Rec."). In simple STC processing, all receiver stations are considered. In multishot STC processing (MSTC), sub-arrays of receiver stations within the receiver array are considered, for example a sub-array of five receiver stations in a receiver array of eight receiver stations (other numbers or receiver stations in the sub-array can be used depending on requirements). In this case, the same formation interval corresponding to the extent of a five receiver station sub-array can be measured several times as the tool is logged through the borehole, the five stations making up the sub-array being selected at each source firing to measure the same formation interval. Another approach, known as "transmitter mode" or "pseudo-transmitter array" ("Tra.") takes waveforms from sequential source firings as the transmitter passes along the interval to be measured. In order to compensate for the movement of the tool between measurements, an effectively stationary receiver station or sub-array must be used. This can be achieved by changing the receiver station considered so that its position in the borehole is effectively stationary as the transmitter is moved through the interval. Borehole compensation ("BHC") can be achieved for P and S mode results by processing receiver array and pseudo-transmitter array waveforms and averaging the results.

Thus it will be appreciated that, with the different acquisition modes of a tool such as the DSI, and the different processing modes available, it is possible to obtain multiple determinations of a slowness or ΔT in a given interval of borehole. For example, it is possible to acquire waveforms for shear slowness determination using two dipole modes (upper dipole and lower dipole), and one monopole mode (P and S mode), and to process each measurement in receiver mode, transmitter mode and borehole compensated form resulting in a potential nine separate determinations of shear slowness for that interval, each of which can give a different result. The problem is therefore to determine which slowness estimate can be considered to give the best indication of the shear slowness of the formation in that interval.

DISCLOSURE OF INVENTION

The present invention provides a method of determining the sonic slowness of an underground formation from sonic measurements, comprising: (i) obtaining sonic waveforms in the underground formation; (ii) determining, from the sonic waveforms, multiple values of at least one parameter related to the sonic slowness of the formation together with an estimate of the error in each value; and (iii) using the estimate of the error in each value to select a parameter value related to slowness as representative of the formation.

The sonic waveforms are preferably obtained by logging an interval of a borehole which runs through the formation with a tool which outputs sonic waveform measurements. The tool can be run on wireline or coiled tubing or the like, or alternatively can be a logging while drilling tool located in a drill string being used to drill the borehole.

The multiple values of the parameter related to sonic slowness can include multiple determinations of monopole and/or dipole compressional and shear (including flexural) slowness, and Stoneley slowness for the formation. Where the tool used to obtain the waveforms comprise an array tool, the multiple determinations can include transmitter and receiver mode measurements and borehole compensated measurments. The processing technique used is preferably a slowness-time-coherence technique.

The processing technique can include amongst its inputs, zoning information derived from the waveform measurements and indicating general features of the formation type being measured. The zoning information can be obtained from a basic compressional slowness estimation, typically based on digital first arrival determination, and can include broad formation slowness classifications such as fast, slow, very slow and extremely slow. Such broad classifications can be based on predetermined cross plots of the ratio of compressional and shear slownesses against measured slowness for know lithologies. Other zoning information can be the presence of closely spaced bed boundaries (thin beds).

Other inputs to the processing technique can include parameters relating to the borehole or well, such as hole diameter, mud type and predetermined formation features.

The specific processing technique applied can vary according to the zoning or parameter inputs.

For example, where zoning information shows relatively thick beds, full array STC-type processing (including dispersive processing) can be applied; if zoning information shows thin beds, high resolution, sub-array multishot STC-type processing can be applied. The processing also preferably includes tracking of slowness measurements along the interval so as to allow individual slowness measurements to be associated with changes in particular components of the waveform (P-waves, S-waves, etc.). The tracking can also make use of the zoning information indicating where major changes occur, and delineating homogenous beds, each with associated semblance error bars.

The output of the processing step is a series of slowness estimates and the tracking can also include the estimation of error in the value of slowness. An estimate of error can be provided by the statistical semblance processing of the slowness measurements. The total error is a combination of the semblance error and the uncertainty in tracking determination. The final step selects the slowness with the minimum error (possibly modified by other predetermined selection rules) and outputs this as the slowness for the interval. For example, the mean error for the interval can be used as the basis for selection. Also, a level by level determination of the variation of the actual error from the mean within the interval can be provided as a further output

DETAILED DESCRIPTION

Figure 3:
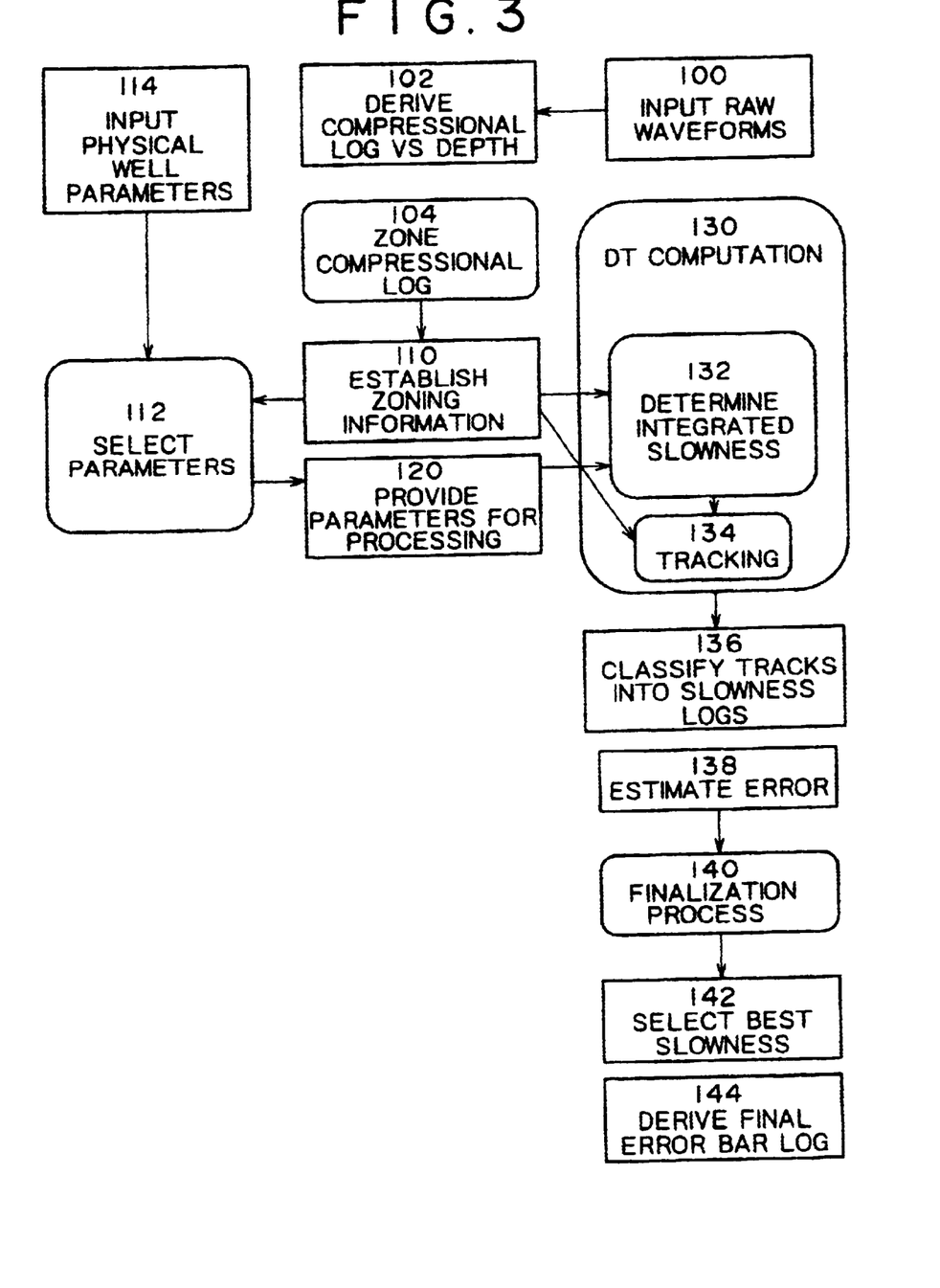
FIG. 3 shows a flow diagram outlining the main features of a method according to one embodiment of the invention.
Figure 4:
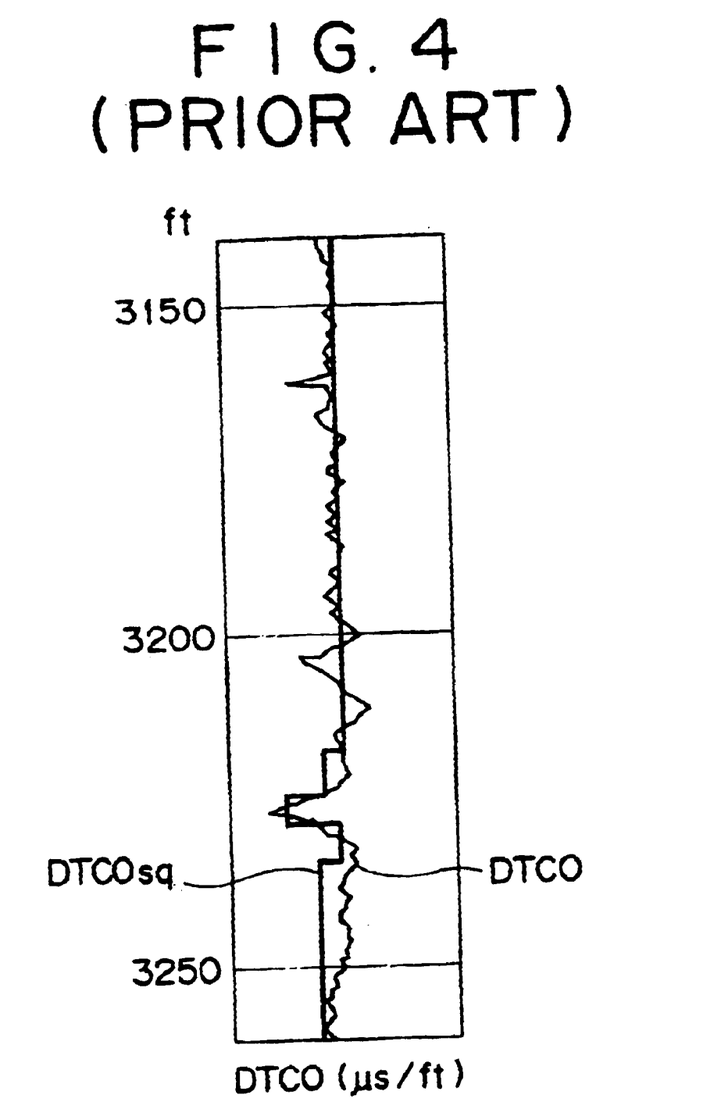
FIG. 4 shows a simple compressional slowness log.

Referring now to FIG. 3, the method summarised therein takes as its inputs the raw waveforms 100 obtained from a borehole logging tool such as the DSI tool from Schlumberger, zoning information 110 and processing parameters 120. The raw waveforms 100 are essentially digital signals comprising the receiver station output in time for a given acquisition mode of the tool (cf. FIG. 1). To obtain the zoning information 110, the raw waveforms 100 are pre-processed using a digital first arrival detection (DFAD) method such as is described in more detail in International Patent Application No. WO97/28464 to derive a crude compressional slowness (DTCO) log vs depth 102 an example of which is shown in FIG. 4. The DTCO log information is analysed 104 to determine the general zones present in the interval of interest. This is achieved by applying predetermined thresholds to the DTCO log and squaring the output so as to broadly classify the log into zones of fast, slow, very slow and extremely slow formation with sharp transitions between the zones (line DTCOsq in FIG. 4), and is called "macro-zoning". Where the zones are changing frequently over relatively short distances (thin beds, for example <2 ft thickness), the log is also indicated as having "micro-zoning". The macro- and micro-zoning information is output to a ΔT computation process 130 (micro-zoning information can be used to indicate bed boundaries and to select multishot STC processing which is described in more detail below) and (for macro-zoning information)to a parameter selection process 112.

The parameter selection process 112 determines from physical well parameters 114 a series of processing parameters (see examples given in the table below) and provides these as a processing parameter input 120 to the ΔT computation process 130.

| Well Parameter | |
| --- | --- |
| Tool Type | |
| Formation Type | Select from automatic using zoning input or manual selection based on VpVs-DTCO crossplot overlaid with formation type regions. |
| Hole Diameter | Bit size, casing ID or caliper |
| Borehole Status | Open Hole or Cased Hole |
| Processing Parameter | |
| Dispersion Curve | Slowness dispersion curve for the mode to be evaluated. |
| Integration Time Window | Window size for coherence calculation, few cycles of lowest frequency component |
| Slowness Lower Limit | Start, stop and increment along |
| Slowness Upper Limit | slowness axis of S/T plane for STC |
| Slowness Step Parameter | processing. |
| Time Lower Limit | Start, stop and increment along |
| Time Upper Limit | time axis of S/T plane for STC |
| Time Step Parameter | processing. |
| Search Band Width | Define limits of S/T plane to be |
| Search Band Offset | processed. |
| Slowness Width | Define mask for peak search. |
| Time Width | |
| Semblance Threshold | Minimum semblance value for peaks. |
| Filter Length, Upper Limit, Lower Limit | Processing frequency band. |
| Mud Global Parameters | Mud type: Brine, WBM, OBM, Slow OBM; or calculate from mud type (brine, emulsion, invert emulsion) salinity, density, temperature. |

It will be appreciated that not all of these parameters might be needed, or that default values might be acceptable in some cases. The particular parameters, how they are derived and their significance will depend on the, particular processing scheme used. There are other parameters which are optional such as optimal frequency selection for processing such as is described in more detail in U.S. Pat. No. 5,587,966.

Figure 5:
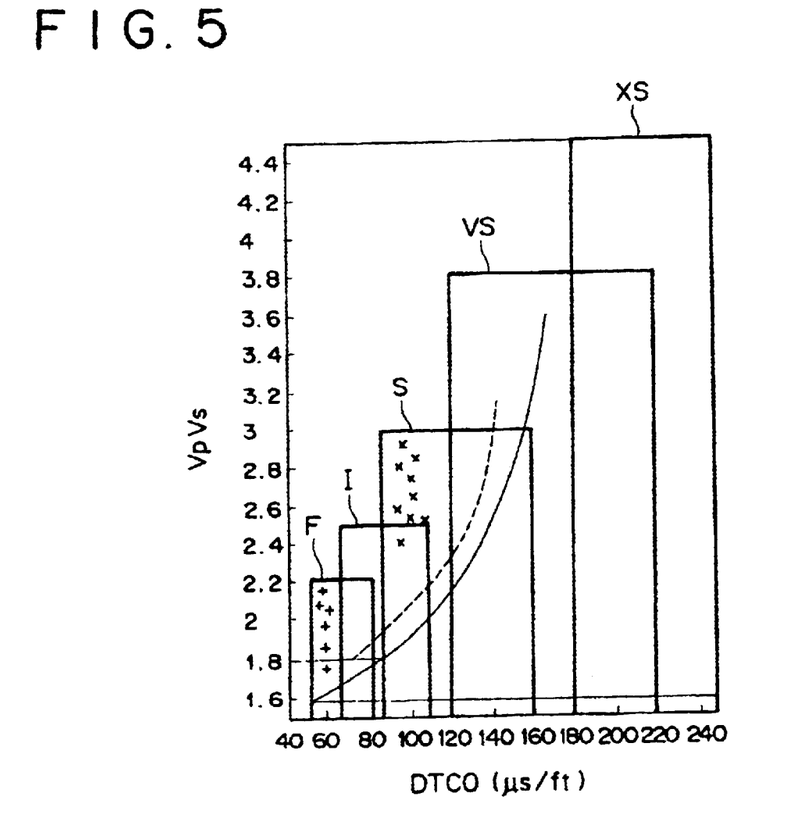
FIG. 5 shows a Vp/Vs vs compressional slowness cross plot.

The parameter "Formation Type" can have two main methods of selection, both of which rely on the zoning step 104. In the first, the DTCO log data for a given level is plotted on a scale which is banded into predefined formation types. In FIG. 5, DTCO data from two depths are indicated by + and x. For the purpose of illustration, these are cross plotted with Vp/Vs and the predefined formation types: fast (F), intermediate (I), slow (S), very slow (VS) and extremely slow (XS) superimposed on the plot The predefined formation types are derived from other log data obtained in a number of locations. The data from depth + fall in a fast formation type while those from depth x fall in a slow formation type. Thus different parameters will be selected for processing the data from these two depths. It will be appreciated that, normally, there will be no Vp/Vs data available and it is only position on the DTCO axis which is used to decide formation type. An alternative method is to output DTCOsq directly as the formation type.

The ΔT computation process 130 comprises two main elements, an integrated slowness determination process 132 and a tracking process 134. The integrated slowness determination process 132 provides a Slowness/Time Coherence (STC) methods for analysing the waveforms. These methods can include one or more of STC, multishot STC (MSTC), fast STC (FSTC) and dispersive STC (DSTC). These different methods are summarised below. In the preferred example, the major processing method utilised is DSTC.

Slowness Time Coherence (STC) Processing

STC processing employs full waveform analysis to find all propagating waves in an array of sonic waveforms. The processing computes a peak vector that identifies all of the arrivals in the waveform data from a sonic array tool such as the DSI. The peak vector consists of seven elements associated with a peak coherence value in the slowness/time plane. Two main steps are carried out in the STC technique:

1. The coherence σ(T,S) is calculated for all reasonable values of Time and Slowness in the S/T plane. σ(T,S) serves as a measure for whether the data includes an arrival at time T and slowness S.
2. Then, the surface σ(T,S) is searched for local maxima with a peak finding process.

The coherence measure is calculated by:

$$\sigma(T, S) = \sqrt{\frac{E_c(T, S)}{MxE_i(T, S)}}$$

Where $E_c(T,S)$ is the coherent energy of the normalised waveforms (square of the summed waveform values), $E_i(T, S)$ is the total energy of the normalised waveforms (sum of the squared waveform values), and M is the number of waveforms, i.e. receivers (receiver stations).

$E_c(T\ S)$ and $E_i(T,S)$ are calculated over a specified time window, usually selected to span several cycles of the main frequency component expected in the waveforms. In $E_c(T, S)$, the waveforms are stacked in time assuming the arrivals move out linearly across the receiver array. For any number of waveforms, the coherence measure σ(T,S) will be between 0 and 1. Values approaching 1 indicate the presence of a highly coherent arrival at time T and slowness S.

The coherence σ(T,S) is calculated within a restricted search band of the S/T plane defined by the slowness lower and upper limits and time lower and upper limits. For a given slowness S between the lower and upper slowness limits, the time (T) in the search band must obey the following rule:

$$S \cdot Z0 + T_{off} - T_{band}/2 \leq T \leq S \cdot Z0 + T_{off} + T_{band}/2$$

where Z0 is the T/R spacing of the tool, $T_{off}$ is the time offset of the search band, and $T_{band}$ is the width along time of the search band.

This rule describes a band of times moving diagonally across the S/T plane from the lower, left-hand corner to the upper, right-hand corner. For $T_{off}$ equal to 0, this band is centred on the slowness-time line (T=S·Z0).

The point ($T_{pk}$, $S_{pk}$) is defined as the peak coherence in the S/T plane search ask if it satisfies the following:

1. σ($T_{pk}$, $S_{pk}$)>0.25 (Threshold value) A rule of thumb is that values greater than 2/M indicate the presence of an arrival. If 8 waveforms are being input, the value of 0.25 can be assumed.
2. σ($T_{pk}$, $S_{pk}$) is a local maximum within the given peak (specified by the slowness width an time width):

$$\sigma(T_{pk}, S_{pk}) > p(T_m, S_m) \text{ for all } T_m \text{ and } S_m$$

such that
$T - T_{mask}/2 \leq T_m \leq T + T_{mask}/2$
$S - S_{mask}/2 \leq S_m \leq S + S_{mask}/2$
where $T_{mask}$ is the time width of the peak mask, and $S_{mask}$ is the slowness width of the peak mask.

The following peak matrix of seven elements are output to seven arrays at every depth processed:

At peak coherence:
1. σ($T_{pk}$, $S_{pk}$) coherence value
2. $S_{pk}$ slowness
3. $T_{pk}$ time
4. $E_c(T_{pk}, S_{pk})$ coherent energy in decibels At peak energy:
5. σ($T_e$, $S_{pk}$) coherence
6. $T_e$ time
7. $E_c(T_e, S_{pk})$ coherent energy in decibels The slowness is the same as for peak coherence.

Signal-to-noise ratio is estimated using the following algorithm:

1. The peak-to-peak amplitude in the signal window is determined at each receiver and the amplitudes are averaged to get an estimate of the signal.
2. The peak-to-peak amplitude in the quite window is determined at each receiver and the amplitudes are averaged to get an estimate of the noise.
3. The signal-to-noise ratio estimate is then simply calculated using the following equation:

$$S/N = 20 \cdot \text{Log } 10 \text{ (signal/noise)}.$$

There are two main depth reference points in the STC processing (or DSTC processing, see below), waveform depth and computation depth. Waveform depth is the depth assigned to all waveforms in the array at a particular depth level and is assumed to be the mid point between the fired transmitter and the first receiver in the receiver array. All waveforms in the array are assigned this depth. The computation depth is the depth assigned to the S/T plane and the peak matrix computed by one STC computation. When a receiver array mode is selected, this depth is the mid-point of the receiver array used in the computation. Thus if all eight receivers are used, the depth is the mid-point between receivers 1 and 8. If a sub-array of receivers 5–8 is used, the depth is the mid-point between receivers 5 and 8. When a transmitter array mode is used, the depth is the mid-point of the transmitter positions forming the pseudo-array.

Dispersive STC (DSTC) Processing

Certain modes of sonic waves are dispersive, for example the dipole flexural shear mode. This means that different frequencies propagate at different phase slownesses, waveshapes change as they propagate across the array, and measurement of shear slowness requires a dispersion model. Processing the flexural mode with standard, non-dispersive processing such as STC (described above) does not give formation shear slowness without the use of model-based corrections. Dispersive STC (DSTC) processes the flexural mode dispersively so no correction for dispersion is required. In STC, waveforms in the window are backpropagated to the reference receiver along lines of constant slowness. This constant slowness is the same slowness as the moved-out window and the calculation can be done entirely in the time domain. The semblance of the backpropagated waveforms is calculated, high semblance values indicating that the backpropagated waveforms are nearly alike which, in turn, indicates that the backpropagating slowness is correct. DSTC performs backpropagation in a different way. The waveforms are backpropagated by a flexural mode dispersion curve equal to that of the data. The dispersion curve is pre-computed from the flexural mode model and for speed the backpropagation is performed in the frequency domain. The shear slowness of the best-fitting curve is returned by DSTC. DSCT also outputs an error bar for the uncertainty of the slowness determination due to noise. Further details of DSTC can be found in U.S. Pat. No. 5,278,805.

DSTC processing has the ability to be applied even to non-dispersive waves such as monopole compressional or shear-. Since the first step required for DSTC processing is the calculation or selection of an appropriate dispersion curve, all that is required is a dispersion curve that represents a non-dispersive wave, i.e. a flat "curve". Consequently, DSTC is the preferred processing scheme for the present invention and will be indicated as such in the following description. However, it will be appreciated that in many cases, STC processing could equally be applied.

Multishot STC (MSTC) Processing

MSTC attempts to improve the resolution of the DSTC full array calculation by processing results from sub-arrays and oversampling the interval of interest. For example, in an eight receiver tool, it is possible to improve resolution by forming smaller sub-arrays of, for example, five receivers. While this reduces the amount of data available from each sub-array, the fact that the tool has multiple opportunities to sample the region with different sub-arrays of the same size means that this can be compensated in the redundancy of the data. MSTC does this using the following procedure:

1. All of the sub-arrays which span the interval of interest are identified.
2. Each sub-array is processed using DSTC (an S/T plane is generated for each sub-array).
3. The S/T planes for the sub-arrays are shifted in time to account for the difference in transmitter-receiver spacing.
4. The semblances from the various sub-arrays are averaged at every value of time and slowness to provide and average S/T plane.

5. The average S/T plane is searched for slowness peaks which are returned in a peak matrix.

The peak matrix output by MSTC contains three elements:

the slowness of the coherence peak, the coherence of the coherence peak, and the time of the coherence peak.

The slowness, time and coherence are simply the slowness, time and coherence of each peak found in the average S/T plane.

Selection of MSTC as the processing is made when the zoning information 110 indicates thin beds (typically <2 ft thickness). A single-shot DSTC computation by MSTC is the same as an STC computation made by DSTC. Further details of MSTC can be found in U.S. Pat. No. 4,809,236. The general processing methodology preferred for the present invention is described in further detail below.

Fast STC (FSTC) Processing

Fast STC (FSTC) processing was developed for use with LWD sonic measurement techniques but is potentially an alternative to the standard STC processing described above. In FSCT the raw waveforms are filtered to give a complex signal type with both real and imaginary parts. Because of the increase in data arising from this, the data are coarsely resampled to reduce the amount of data and only the real part of the complex signal data are saved for display purposes. The basic processing other than the filtering and sampling are as for STC. Further details of FSTC can be found in U.S. Pat. No. 5,594,706.

Figure 6:
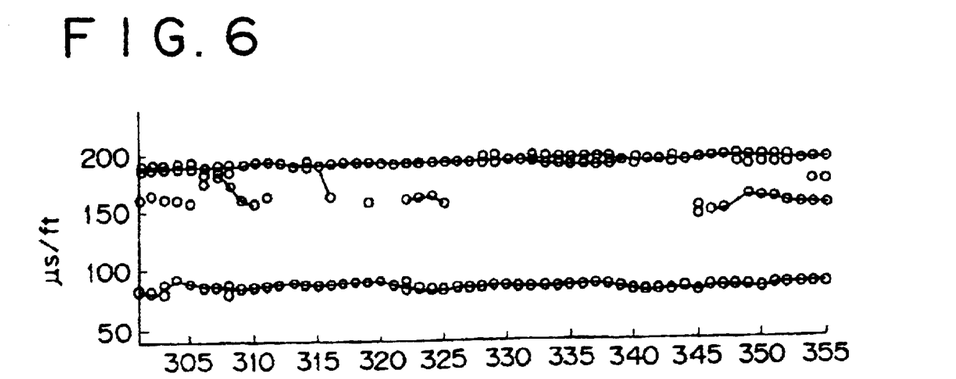
FIG. 6 shows a slowness log with multiple slowness determinations.

Whichever processing method is used, the output is typically more than one slowness for each depth, e.g. compressional slowness, shear slowness and Stoneley slowness. FIG. 6 shows a log with more than one slowness (e.g. compresional, shear, Stoneley) indicated for each level. It is generally desired to monitor the development of these properties along the well and so it is necessary to decide which slowness is which from depth to depth in the well. This can be difficult in cases where the slownesses are similar in value or cross each other, or are missing because of bad data at a given depth. Commonly used techniques for connecting peaks in a continuous curve are called labelling and some use a logical decision tree, level by level. More sophisticated techniques use a weighted cost function over a short interval to select an optimum path. The particularly preferred approach is to use a two-step process 134, first joining the peaks that correspond to the same waveform arrival ("track search"), and second identifying the track with a name ("classification").

To perform the track search, the sequence of measurements that are sufficiently continuous are enumerated and their probabilities computed. In order to know how to associate the different peaks with the different track built in this way, all possible hypotheses are computed and the corresponding probabilities derived. With this information, and by applying Bayes theorem, the a posteori probability can be computed and the hypothesis with the most probable value selected to build a track. FIG. 6 shows point on the log connected to form tracks. Classification is achieved by forming different hypotheses based on a propagation model to give all possible classifications of tracks built, and associating a priori probabilities with these hypotheses. Knowing the data and the a priori probability model, the a posteori probabilities of the different hypotheses can be computed and the most probable hypothesis considered to classify the tracks 136. Since the classification is statistical in nature, the error in the determinations can be estimated and output as a quality indicator in each case 138. The zoning information 110 is also input to this determination since it helps identify where transitions between formation types might cause sudden changes in the slowness curves which otherwise might be misinterpreted.

The track search methodology is as follows: Where $Z^k$, is the set of all measurements up through the depth k and Z(k) is the measurement at the same depth, if at depth k n peaks are recorded, the measurement Z(k) is composed of n slownesses, n times and n semblances. $Z^k$ consists of all measurements up to and including the considered depth:

$$Z^k = \{Z(0), Z(1), \ldots, Z(k)\}$$

If $q_i^k$ is the i-th global hypothesis for the measurements $Z^k$, up through depth k, each $q_i^k$ gives one possible complete explanation of the measurements up through the considered depth. Thus the sequences of measurements continuing over depth (tracks) are completely specified and the measurements not taken into account are considered as false alarms. This hypothesis can be decomposed as two parts $q_i(k)$ and $q_{1(i)}(k)$. The first hypothesis, $q_i(k)$, specifies at depth k, how measurement Z(k) is assigned to tracks and how tracks at depth k−1 are linked with tracks at depth k. The hypothesis, $q_{1(i)}(k)$, specifies the 1(i) hypothesis for measurement for measurements through to depth k−1, $Z^{k-1}$. This decomposition can be rewritten as follows:

$$Z^k = Z^{k-1} \cup Z(k)$$

$$q_1^k = q_{1(1)}^{k-1} \cup q_i(k)$$

This shows that it is possible recursively to generate all hypotheses for all measurements up to the current depth, k. The tracking algorithm works by forming hypotheses about measurements and evaluating their probabilities using prior probabilities model and Baye's rule. The probability of the global hypothesis $q_i^k$ based on all available measurements $Z^k$ can be expressed as:

$$P(q_i^k | Z^k) = \frac{P(Z(k)|q_i^k, Z^{k-1}) P(q_i(k)|q_{1(i)}^{k-1}, Z^{k-1}) P(q_{1(i)}^{k-1}|Z^{k-1})}{C_k}$$

This equation is the general equation of the tracking algorithm without any simplification assumptions. The denominator $C_k$ is a normalising constant obtained by summing the numerator of the equation over i. Conceptually, the tracking search part is completely defined by this equation. Each time a new frame of data Z(k) is acquired, the hypothesis, $q_i(k)$, at this depth is generated and appended to the hypothesis for the measurements up through k−1, the previous depth, $q_{1(i)}^{k-1}$ and finally the prior probability and data likelihood models are used to compute $P(q_i^k|Z^k)$.

The last term of the numerator in the equation, $P(q_i^{k-1}|Z^{k-1})$ represents the probability of the parent global hypothesis which is considered to be known from the previous depth. The two other terms of the numerator equation can be obtained according to Kurien, T, 1992, Issues in the design of practical multi-target tracking algorithms., Multitarget-multisensor tracking: applications and approaches., Artech House. The term $P(q_i(k)|q_{1(i)}^{k-1}, Z^{k-1})$ is defined as $$P(q_i(k)|q_{l(i)}^{k-1}, Z^{k-1}) = P(g_r|O_i, N_i, Z^{k-1})P(h_s|O_i, O_{l(i)})P(O_i|O_{l(i)}, Z^{k-1})$$

where $O_i$, the modelorder, gives the number of tracks at one depth k implied by $q_i(k)$ and $O_{1(i)}$ is the modelorder implied by $q_{1(i)}^{k-1}$. $N_i$ is the sum of all the tracks observed at the depth k and the number of false alarm measurements implied by $q_i(k)$. $g_r(O_i,N_i)$ is considered as the r-th way to classify $N_i$ measurements as false alarms and arrivals up to $O_i$ arrivals. In fact the current modelorder $O_i$ and the number of measurements $N_i$ determine the number of possibilities in which $N_i$ measurements are classified as false alarms and arrivals up to a maximum of $O_i$ arrivals. The probability $P(g_r|O_i,N_i)$ is computed with the assumption that each $O_i$ arrival is independent of any others and of the false alarms. Supposing that for one frame of $O_i$ arrivals each has a probability p to appear at the current depth and a probability 1−p not to appear. The false alarms are modelled as independent and their number is modelled as Poisson distribution with mean 1. Considering K of the $O_i$ arrivals present in the classification $g_r(O_i,N_i)$ then there are K arrivals and $N_i$−K false alarms and the probability is:

$$P(g_r(O_i, N_i)|O_i, N_i) = p^K(1-p)^{O_i-K}\frac{\exp(-\lambda)\lambda^{N_i-K}}{(N_i - K)!}$$

$h_s(O_i, O_{1(i)})$ is a function that gives the s-th possible way to assign $O_i$ tracks at depth k with the $O_{1(i)}$ tracks in the previous depth k−1. This function gives an enumeration of the different ways to link tracks in the current depth with those in the previous depth. Considering that all the combinations are equally probable, for $\psi(O_i,O_{1(i)})$ possibilities, then $$P(h_s | O_i, O_{l(i)}) = \frac{1}{\psi(O_i, O_{l(i)})}.$$

The classification of measurements as arrivals or false alarms, $g_r(O_i,N_i)$, and track assignment, $h_s(O_i,O_{1(i)})$, with the probability models $P(h_s|O_i,O_{1(i)})$ and $P(g_r(O_i,N_i)O_i,N_i)$ give a complete determination of $P(q_i(k)|q_{1(i)}^{k-1},Z^{k-1})$.

The last term of the concept equation is computed as follows: Given data Z(k) at depth k decomposed into a continuous part C(k) and a discrete part N(k): Z(k)={C(k), N(k)}.

Considering C(k) and N(k) are independent, $P(N(k)|q_i^k, Z^{k-1}$ can be rewritten as:

$$P(Z(k)|q_i^k, Z^{k-1}) = P(C(k)|q_i^k, Z^{k-1})P(N(k)|q_i^k, Z^{k-1})$$

where $P(N(k)|q_i^k,Z^{k-1})=1$ if $N_i=N(k)$ and 0 otherwise.

$q_i^k$ completely describes the sequences of measurements which belong to the same tracks. To know if the sequences of measurements enumerated as "sufficiently continuous" to qualify as real tracks or not, the probability likelihood model for the continuous part of the data $P(C(k)|q_i^k,Z^{k-1})$ must be provided.

C(k) is formed by the slowness-time co-ordinate of each peak modelled as a 2D measurement vector. Assuming that the prior probability model considered is that the sequences of slowness and time are Gaussian random process, the correlation of slowness and time along depth is modelled as the output of an ARMA filter with known coefficients. To compute this probability, Kalman filter theory is used. Scharf, L., 1991, *Statistical signal processing: Wiley*, is used to implement the ARMA filter via a Kalman state representation and Harve), A., 1994. Time series models: MIT Press, to implement the Kalman update and prediction equations. Given the prior continuity model for a track I, and using successive conditioning, Kalman filter equations allow the computation of $P(C^k|I)$ which is the probability of continuous measurements from depth 0 to k:

$$P(C^k|I) = \prod_{i=1,k} P(C(i)|C^{i-1}, I)$$

Each of the terms in the equation can be computed using Kalman prediction and update equations. At each depth k, Kalman prediction gives the 2D Gaussian probability distribution of the slowness-time given the past measurements $C^{i-1}$. The likelihood of the data C(i) belonging to the track is computed by evaluating the Gaussian distribution at the slowness-time point specified by C(i). Knowing this information, the 2D Gaussian probability distribution of silo slowness-time at depth i+1 is predicted using C(i) and the result of updating of the state and covariance matrix via the Kalman update equation. This is the final term $P(Z(k)|q_i^k, Z^{k-1})$ needed to complete the likelihood computation above.

By applying this methodology to the measurement data, measurements can be linked together on a depth-by-depth basis to form tracks. Those measurements that cannot be so linked are rejected. It is then necessary to assign each track to a physical attribute, for example monopole compressional arrivals, monopole shear arrivals, etc. The approach used in this invention is to first make certain assumptions, for example that the first arrival track will be monpole compressional followed by monopole shear followed by Stonely. Given these assumptions, the data making up the tracks is then tested to determine the probability that a track fits these assumptions and are classified according to which assumption shows the highest probability. The general methodology for this determination is as follows:

$D^k$ is the track data at depth k and contains the following information: m, called the modelorder, that gives the number of tracks identified at the k-th depth, the triplet (P, t, r), the slowness, time and semblance of each track, and some linking information that provides how a track at depth k is linked with the detected tracks at depths k−1 and k+1. $H_j^k$ is the j-th hypothesis at depth k. The index j corresponds to the number of hypotheses in the particular case, for example in the case of monopole the value is 3 (for the three modes: compressional, shear and Stoneley). The posterior probability $H_j^k$ given the data at depth k−1 and all previous depths is defined by the following equation where (.) denotes $(D^{k-1}, \ldots D^1)$:

$$P(H_j^k | D^k, \ldots, D^1) = \frac{P(D^k|H_j^k, (.))P(H_j^k|(.))}{\sum_j P(D^k|H_j^k, (.))P(H_j^k|(.))}$$

$$= \frac{P(D^k|H_j^k)P(H_j^k|(.))}{\sum_j P(D^k|H_j^k)P(H_j^k|(.))}$$

This considers that the data likelihood for the data at the current depth depends on the previous data only through the hypothesis at the current depth, which means $P(D^k|H_i^k, (.))=P(D^k|H_i^k)$. These two equations are the main equations of the classification.

The hypotheses for a given depth depend upon the number of tracks (m) at this depth. To assign the probabilities $P(H_j^k|H_i^{k-1})$ some hypotheses at the current depth will be taken as consistent with the hypotheses at other depths and other will not. For example, if the classification classifies one track at depth k−1 as a component A and classifies a track at depth k as the same arrival A, this gives the most probable chance to classify the detected track as arrival A compared to any other. Therefore, $P(H_j^k|H_i^{k-1})=K$ if the hypotheses $H_j^k$ and $H_i^{k-1}$ are consistent over the depth and zero otherwise. The value K is determined as follows: for M consistent hypotheses found, K=1/M. Thus K is linked with the number of consistent hypotheses found. In this case, all the hypotheses are taken into account as equally probable and it is assumed that the track search part has made no mistakes when linking measurements over the depth. Given a finite probability of error in the track search part, $P(H_j^k|H_i^{k-1})=p$ when the hypotheses are consistent over depth and 1−p otherwise, with $0 \leq 1-p \leq 1$. In this case it is necessary to set the value of p inside the algorithm.

The computation of the likelihood $P(D^k|H_j^k)$ assumes that the tracks are independent of each other the model used to compute $P(D^k|H_j^k)$ considers that each track is a slowness-time point in the 2D slowness-time plane which is Gaussian distributed. The prior probability of this slowness-time point depends upon the classification assigned to that point by $H_j^k$. If the number of tracks equals one, then the $P(D^k|H_j^k)$ is a Gaussian distribution with mean and variance given by $H_j^k$ and evaluated at the slowness-time point given by $D^k$. For more than one arrival, the assumption is that the independency of tracks and $P(D^k|H_j^k)$ is the product of all Gaussian distributions evaluated.

It will be appreciated that the tracking and classification methodologies described above can be applied to sonic logging data independently of the other processing steps described here.

The slowness logs 136 together with the appropriate error bars 138 are output to a finalisation process 140 which computes and selects the best compressional, slowness, the best shear slowness and the best Stoneley slowness out of those available 142, e.g.:

1. Compressional Slowness:
   P&S Rec., Tra., or BHC
   UDP Rec., Tra., or BHC
   LDP Rec., Tra., or BHC
2. Shear Slowness:
   P&S Rec., Tra., or BHC
   LUDP Rec., Tra., or BHC
   LDP Rec., Tra., or BHC
3. Stoneley slowness:
   MST Rec., Tra, or BHC The process selects the log with the minimum error bar. The best slowness is computed from one or more datasets using the following steps:

1. A mean error is computed over the whole interval over depth for every candidate.
2. The mean error is computed for each processing mode, i.e. Rec. or Tra. If the candidate is processed by BHC mode, the mean error values from both processing modes are averaged.
3. Absent value resident in the error bar logs is regarded as a large error in the error computation.
4. A candidate is selected which has the minimum mean error.
5. Slowness is computed level by level based on the error bars of the selected candidate.
6. If an error at a level is bigger than a threshold, absent is assigned as a slowness at the level (no-log condition). If the candidate is processed by BHC mode, the procedure looks over both errors of receiver and transmitter mode. If their errors are similar, the mean slowness is assigned as the slowness, otherwise the one with the smallest error is chosen.
7. Final error bar logs associated with the selected slowness logs are derived in the same way 144.

The general multi-shot processing methodology preferred for the present invention is as follows:

For the case of multiple shots at depth $Z_n$:

$A_i$ is the waveform taken into account to process MSTC.

i is the number of a sub-array (i=1, N).

$F_i$ is the ST plane computed for the sub-array i.

A frame is represented as a function of two parameters: $F_i=F_i(t,S)$ where t is the time and S the slowness. For N sub-arrays, N=1, 5 for example, five frames $F=\{F_1, F_2, F_3, F_4, F_5\}$ are obtained where F is the family of frames at depth Z.

The object of the multiple shot is to compute $$F_{stack} = \sum_{n=1}^{N} F_i$$

But as there is a shift in time between two consecutive frames, it is necessary to take into account this time shift before computing the MSTC processing.

Between frame $F_i$ and $F_{i-1}$, the tool moves a known distance d=Δz. For a frame $F_i(t,S)$, to shift this array before computation of the multiple shot, it is necessary to apply the following operation: for the point $A(t_i, S_i)$ located in the ST plane, it is necessary to shift it by:

$$tt_i=t_i-d\cdot S(t_i).$$

For the totality of the frame, after time shift, this gives:

$$F_i(t,S)=F_i(t-(i-1)d\cdot S(t),S).$$

This equation, called the time shift equation, explains how to make a shift in time between one frame and the succeeding frame. Conceptually to stack to ST plane of each array it is necessary to apply this correction.

Starting with the equation above, it is possible to rewrite it as a general equation:

$$F_i(t,S)=F_i(t,S)*\delta(t-(i-1)d\cdot S(t),S)$$

where * is the convolution operator on the variable t.

To resample the frame to stack it with others, the shah function is used, defined as:

$$shah(t) \equiv \sum_{n=-\infty}^{+\infty} \delta(t-n).$$

For a signal s(t) it is possible to rewrite this signal as:

$$s_\tau(t) = s(t)shah\left(\frac{t}{\tau}\right).$$

Thus the signal s(t) is discretised with a sampling rate τ.

Rewriting the equation of a frame shifted in time and after resampling gives:

$$F'_{i,\tau}(t, S) = F'_i(t, S)\text{shah}\left(\frac{t}{\tau}\right).$$

Developing this equation gives:

$$F'_{i,\tau}(t, S) = F'_i(t, S)\text{shah}\left(\frac{t}{\tau}\right)$$

$$= [F_i(t, S) * \delta(t - (i-1)d \cdot S(t))]\text{shah}\left(\frac{t}{\tau}\right)$$

$$= |\tau| \sum_{n=-\infty}^{+\infty} [F_i(t, S) * \delta(t - (i-1)d \cdot S(t))]\delta(t - n\tau)$$

This defines the transformation to be applied on each frame before stacking.

Knowing the transformation that it is necessary to apply on a frame i, it is possible to write the general equation of multi-shot processing. For a given level Z, this is:

$$F_{stack} = F_1(t, S) + \sum_{i=2}^{N} \sum_{n=-\infty}^{+\infty} |\tau|[F_i(t, S) * \delta(t - (i-1)d \cdot S(t))]\delta(t - n\tau).$$

This equation is the general multi-shot equation independent of the medium (homogenous or heterogeneous). To avoid the problem of increase computation time due to resampling in time and time shift an alternative is proposed that is conceptually similar to the multi-shot equation. The idea is to include the time shift problem during the processing of MSTC. Presently, when computing MSTC, one receiver is selected as reference for all of the processing. In the present case, the reference receiver of each sub-array is changed before computing the semblance of this sub-array. The preferred approach is to use as a reference the first receiver of the first sub-array, the second receiver of the second sub-array and so on. Each time the semblance for each of these sub-arrays is computed. This takes into account the time shift between the different sub-arrays, so it is possible to stack the semblances immediately after computation, the time shift between the different sub-arrays being taken into account.

After the time shift correction has been made, and the semblance for each sub-array computed, it is necessary to stack the ST planes by using an algebraic mean to compute the final ST plane at one considered depth. This is achieved by computing:

$$F(S, t) = \sum_{i=1}^{N} F_i(S, t)$$

where $F_i$ is the ST plane computed for one sub-array, and N is the number of sub-arrays used to compute the final multi-shot result.

Efficient processing of multi-shot data requires that the following be determined:

1. The number of sub-arrays used to compute the multi-shot.
2. Selection of good sub-arrays for computing multi-shot.
3. Automatic detection of the reference receiver for each sub-array.

For a tool with R receivers, $R_{sb}$ is the number of receivers in a sub-array. This number is selected by the user and is linked to the resolution to be obtained. By definition its lower limit is 3. The number does not change the actual processing, just the physical interpretation of the result of the processing. $N_{sb}$ is the maximum number of sub-arrays used to compute the multi-shot. This value is equal to the number of measurement depths through which the tool is moved to make the multi-shot measurements and can be defined as:

$$N_{sb} = R - R_{sb} + 1.$$

In order to know which receivers it is necessary to use to compute the multi-shot, a "geometrix matrix" is implemented. When computing a multi-shot, it is necessary to change the reference receiver for each sub-array when computing the ST plane to take into account the time shift correction. For $N_{sb}$ sub-arrays of $R_{sb}$ receivers, the geometrix matrix is defined as:

$$G = \begin{pmatrix} r_{n+R_{sb}} - 1 & r_{n+R_{sb}} - 2 & \cdots & r_{n+1} \\ r_{n+R_{sb}} - 2 & r_{n+R_{sb}} - 3 & \cdots & r_n \\ \vdots & \vdots & \ddots & \vdots \\ r_n & r_{n-1} & \cdots & r_{n-N_{sb}+1} \end{pmatrix}$$

The first receiver of the first sub-array $r_n$ is equal to the value of sub-array necessary to compute the multi-shot. Therefore, $r_n = N_{sb}$, the second receiver of this sub-array is $r_{n+1}$ and so on. Each column of the matrix can be computed as:

$$r_i = r_n + i, \quad i = 0, R_{sb},$$

Where i is the number of the receiver inside the sub-array. The reference receiver is always the same as the first receiver of the first sub-array. Thus if this value is computed at the beginning of the calculation, all of the parameters for the STC processing are fixed for this computation and it is not necessary to redefine the reference receiver for each sub-array. Furthermore, the geometrix matrix allows easy identification at each frame the receivers that are activated and deactivated at that depth. Consequently, it is merely necessary to multiply the receiver status by the current vector to know which receivers are to be used, thus simplifying data management. All that is needed is to know whether or not a receiver is active for a given frame, since data from all receivers is calculated at the beginning and the results used by circular permutation of the column of the matrix for each new frame.

It will be appreciated that this approach can be used for any multi-shot processing and not just in accordance with the present invention.

The present invention finds application in the field of characterising underground formations surrounding borehole such as in the oil and gas industry.

What is claimed is:

1. A method of determining the sonic slowness of an underground formation from sonic measurements, comprising:

(i) obtaining sonic waveforms in the underground formation;

(ii) determining, from the sonic waveforms, multiple values of at least one parameter related to the sonic slowness of the formation together with an estimate of the error in each value; and (iii) using the estimate of the error in each value to select a parameter value related to slowness as representative of the formation.

2. A method as claimed in claim 1, wherein the multiple values of the parameter related to slowness include multiple values of compressional, shear and/or Stoneley slownesses.

3. A method as claimed in claim 1, wherein the sonic waveforms are obtained using a tool having one or more transmitters and an array of receivers.

4. A method as claimed in claim 3, wherein sonic waveforms are obtained in transmitter mode, receiver mode and/or borehole compensated mode.

5. A method as claimed in claim 3, wherein the sonic waveforms are derived from monopole or dipole measurements.

6. A method as claimed in claim 1, wherein the step of determining the parameter related to sonic slowness includes the step of determining a formation type parameter from the sonic waveform.

7. A method as claimed in claim 6, wherein the formation type parameter is derived from a compressional slowness log wherein thresholds have been applied thereby squaring the log output to fit into predetermined bands.

8. A method of determining the sonic slowness of an underground formation from sonic measurements, comprising:
   (i) obtaining sonic waveforms in the underground formation;
   (ii) determining, from the sonic waveforms, multiple values of at least one parameter related to the sonic slowness of the formation together with an estimate of the error in each value; and
   (iii) using the estimate of the error in each value to select a parameter value related to slowness as representative of the formation, wherein the step of determining the parameter related to slowness further includes selecting processing parameters relating to well properties, formation properties and waveform processing parameters, and applying these parameters to, the processing of sonic waveforms.

9. A method as claimed in claim 8, wherein the processing parameters comprise at least one parameter that is selected by a user and at least one parameter that is selected or calculated on the basis of the at least one parameter selected by a user.

10. A method as claimed in claim 9, wherein the number of parameters selected by a user is relatively small compared to the number of parameters that are selected or calculated on the basis of the at least one parameter selected by a user.

11. A method as claimed in claim 8, wherein the waveforms are processed using a slowness time coherence technique.

12. A method as claimed in claim 11, wherein a multishot technique is used in formations in thin beds.

13. A method of determining the sonic slowness of an underground formation from sonic measurements, comprising:
   (i) obtaining sonic waveforms in the underground formation;
   (ii) determining, from the sonic waveforms, multiple values of at least one parameter related to the sonic slowness of the formation together with an estimate of the error in each value; and
   (iii) using the estimate of the error in each value to select a parameter value related to slowness as representative of the formation; and
   (iv) linking the values of the parameter related to slowness along the interval of interest into tracks which describe the development of a particular slowness parameter in that interval.

14. A method as claimed in claim 13, further comprising assigning identifiers to each track which identify a particular slowness parameter to which the track data relates.

15. A method as claimed in claim 14, wherein the estimate of error in each value is determined for each track.

16. A method as claimed in claim 15, wherein, for a given parameter related to slowness with multiple candidates, the candidate with the minimum mean error is selected as representative of that parameter.

17. A method as claimed in claim 16, further comprising outputting error logs for the selected candidate logs.

18. A method as claimed in claim 2, wherein the sonic waveforms are obtained using a tool having one or more transmitters and an array of receivers.

19. A method as claimed in claim 4, wherein the sonic waveforms are derived from monopole or dipole measurements.

20. A method as claimed in claim 11, further comprising linking the values of the parameter related to slowness along the interval of interest into tracks which describe the development of a particular slowness parameter in that interval.

* * * * *